US012666493B2

(12) United States Patent
Sugiyama et al.

(10) Patent No.: US 12,666,493 B2
(45) Date of Patent: Jun. 23, 2026

(54) RRC IDLE MODE TRANSITION FOR NON-TERRESTRIAL NETWORK CELL

(71) Applicant: Sharp Kabushiki Kaisha, Sakai City (JP)

(72) Inventors: Edward Masami Sugiyama, Vancouver, WA (US); Atsushi Ishii, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 18/476,135

(22) Filed: Sep. 27, 2023

(65) Prior Publication Data

US 2025/0106933 A1     Mar. 27, 2025

(51) Int. Cl.
*H04W 76/28*     (2018.01)
*H04W 76/38*     (2018.01)
*H04W 84/06*     (2009.01)

(52) U.S. Cl.
CPC ........... *H04W 76/28* (2018.02); *H04W 76/38* (2018.02); *H04W 84/06* (2013.01)

(58) Field of Classification Search
CPC ..... H04W 76/38; H04W 84/06; H04W 76/28; H04W 76/30; H04W 76/27; H04W 64/00
See application file for complete search history.

(56) References Cited

U.S. PATENT DOCUMENTS

| | | | |
|---|---|---|---|
| 2021/0076438 A1* | 3/2021 | Lee | H04W 36/0058 |
| 2023/0213661 A1* | 7/2023 | Shrestha | G01S 19/396 |
| | | | 455/456.1 |
| 2024/0421894 A1* | 12/2024 | Hoppe | H04B 7/18539 |
| 2025/0159595 A1* | 5/2025 | Wu | H04W 48/16 |

OTHER PUBLICATIONS

3GPP TS 38.304 V17.5.0, NR; User Equipment (UE) procedures in Idle mode and RRC Inactive State (Release 17) Jun. 2023.
3GPP TS 38.331 V17.5.0, NR; Radio Resource Control (RRC) protocol specification (Release 17) Jun. 2023.

* cited by examiner

*Primary Examiner* — Margaret G Webb
(74) *Attorney, Agent, or Firm* — Austin Rapp

(57) ABSTRACT

A wireless terminal is described. The wireless terminal includes circuitry configured to derive a release connection time interval based on a start time of non-terrestrial network (NTN) discontinuous coverage.

6 Claims, 12 Drawing Sheets

RRC IDLE MODE TRANSITION FOR NON-TERRESTRIAL NETWORK CELL

TECHNICAL FIELD

The present disclosure relates generally to communication systems. More specifically, the present disclosure relates to Radio Resource Control (RRC) idle mode transition for a non-terrestrial network cell.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
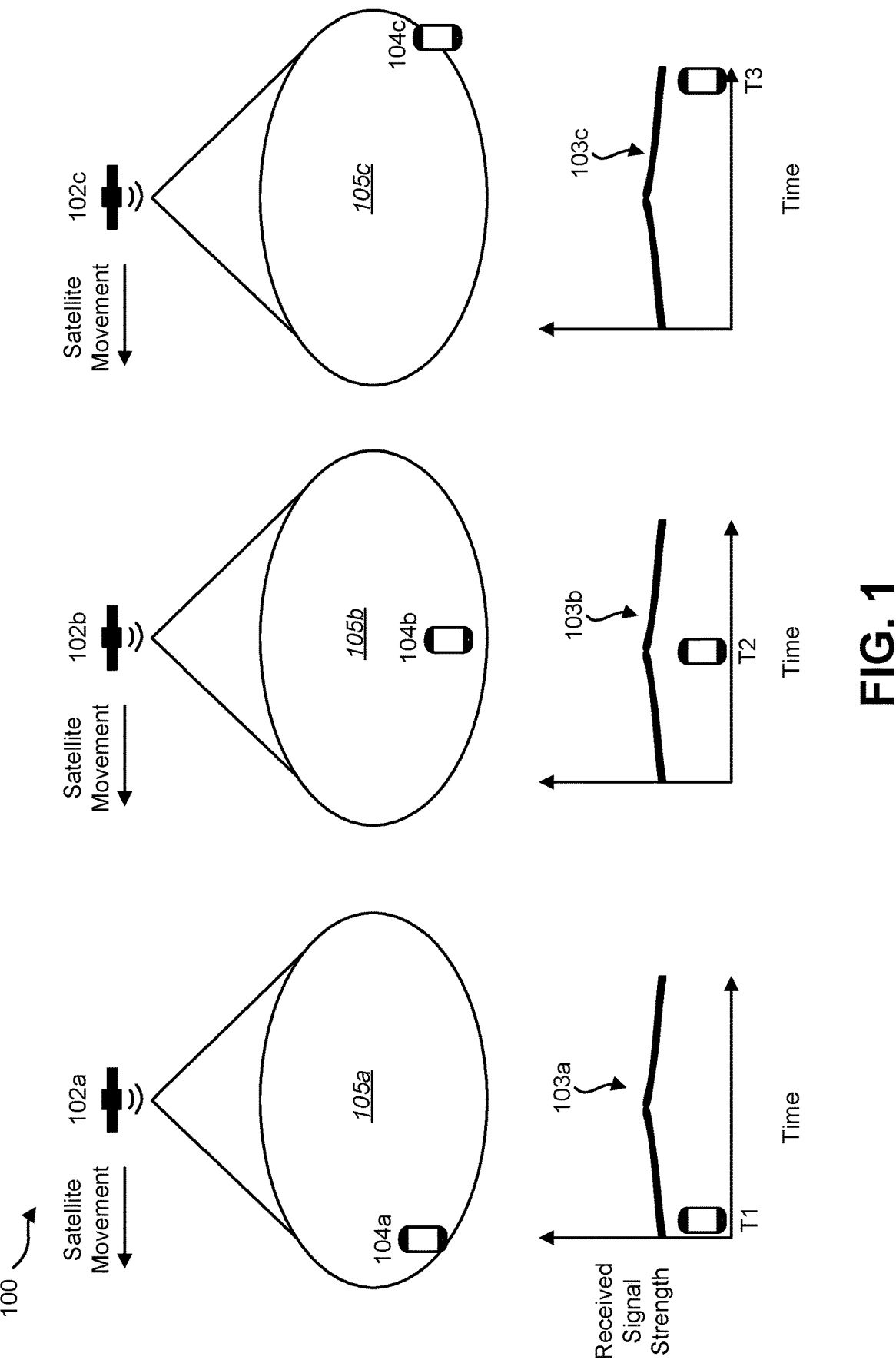
FIG. 1 is a diagram illustrating an example of non-terrestrial networks (NTN)

A wireless terminal is described. The wireless terminal includes receiving circuitry configured to derive a release connection time interval based on a start time of non-terrestrial network (NTN) discontinuous coverage. The release connection time interval may be derived to prevent re-selection of a non-terrestrial network (NTN) cell by the wireless terminal for a specific amount of time.

In some examples, the wireless terminal may enter an RRC_IDLE state without receiving a release message from a core network node.

In some implementations, the wireless terminal may execute a modified cell search procedure if a connection release occurs within the release connection time interval. The modified cell search procedure may include performing additional verification on a potential suitable cell before a cell barring check. In further examples, the wireless terminal may execute a standard cell search procedure if a connection release does not occur within the release connection time interval.

A core network node is also described. The core network node includes transmitting circuitry configured to derive a release connection time interval based on a start time of non-terrestrial network (NTN) discontinuous coverage. The release connection time interval may be derived to prevent re-selection of a non-terrestrial network (NTN) cell by the wireless terminal for a specific amount of time.

In some examples, the transmitting circuitry may be further configured to transmit a connection release within the release connection time interval thereby causing the wireless terminal to execute a modified cell search procedure. The transmitting circuitry may also be configured not to transmit a connection release within the release connection time interval thereby causing the wireless terminal to execute a standard cell search procedure.

A method by a wireless terminal is also described. The method derives a release connection time interval based on a start time of non-terrestrial network (NTN) discontinuous coverage. The method also enters an RRC_IDLE state without receiving a release message from a core network node.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect. UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B." "eNB." "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio." "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IoT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminals in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including High-Altitude Platform Station (HAPS) and High Elliptical Orbit (HEO) satellite). Detailed descriptions are shown in Table 1.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

Wireless terminals, that may include CIoT (Cellular IoT) may also support connections to both a Terrestrial (TN) and Non-Terrestrial Network (NTN). CIoT devices are battery powered, and extended battery life is an important Key Performance Indicator (KPI). If a wireless terminal is connected to an NTN earth moving cell, the wireless terminal may experience periods of discontinuous coverage or NTN cell coverage unavailability. A proposal has been made in 3GPP RAN2 that CIoT wireless terminals connected to an NTN cell transition to RRC_IDLE before discontinuous coverage is about to start. Once the wireless terminal transitions to idle mode, cell reselection process is enabled to determine presence of a suitable cell. Because the wireless terminal was forced to transition to idle mode, the suitable cell measurements may still indicate that the previous NTN cell that released the connection may still be the best cell for reselection. Unfortunately, that NTN cell may shortly move away from the coverage area and the wireless terminal will repeat the process of selecting another cell once the NTN coverage disappears. The main purpose for the network to release connection before start of discontinuous coverage is to reduce additional wait time of radio link failure (RLF) and thus saving power consumption. However, if the CIoT wireless terminal reselects the previous NTN cell that released the connection, there will be no gain in power savings as the cycle of forced to idle may be repeated. This disclosure solves and prevents a wireless terminal from re-selecting an NTN cell that may shortly enter into discontinuous coverage.

Currently, if the CIoT wireless terminal is in connected mode with a non-earth fixed NTN satellite, the network does not transmit RRCRelease command, while the satellite enters discontinuous coverage state. The following occurs once the satellite enters discontinuous coverage:

CIoT wireless terminal will attempt to resynchronize while the Radio Link Failure (RLF) timer is started.

Once RLF timer expires, the CIoT wireless terminal connection is released after the reception of the RRCRelease message.

CIoT wireless terminal executes cell reselection evaluation process to find a suitable cell to camp on.

With the proposed force to idle mode, steps 1 and 2 are skipped so that the CIoT wireless terminal searches for a cell to reselect. However, if the CIoT wireless terminal reselects the same cell that it disconnected from, additional steps may be repeated and or wireless terminal may experience RLF procedures consuming power during that process.

This disclosure proposes systems and methods for preventing wireless terminals that were forced to Radio Resource Control (RRC) Idle mode from camping back on the previously connected NTN cell. Specifically:

A core network node that transmits connection release command from a Non-Terrestrial Network cell to a wireless terminal with cause code to prevent connection re-establishment for specific amount of time.

A wireless terminal that transitions to RRC_IDLE state from RRC_CONNECTED state without a release command from the core network and prevents cell reselection for a specific time period.

A wireless terminal that transmits to a core network node a suggested time to release connection, and the core network node responds with preferred connection release time.

A core network node that transmits to a wireless terminal a wait timer after negotiated connection release time before the wireless terminal autonomously transitions to RRC idle state from RRC connected state.

The battery consumption of CIoT wireless terminals is higher if the device is in RRC_CONNECTED state compared to RRC_IDLE state. One method to achieve faster transition to RRC_IDLE mode is to skip the process of determining radio link failure (RLF) before the loss of signal. In most cases, RLF may occur at any time due to conditions such as weather, obstruction, and wireless terminals moving away from the connected cell. Because of these variable conditions, the wireless terminal may not be able to predict when the loss of signal occurs. However, if the wireless terminal is connected to a non-earth-fixed NTN cell such as LEO or MEO, the time of signal loss due to discontinuous coverage may be computed. The core network node or wireless terminal may transition from RRC_CON-NECTED mode to RRC_IDLE mode shortly before the computed time. By forcing the wireless terminal to RRC_IDLE, the additional procedures for upcoming radio link failure detection may be skipped, reducing power consumption for NTN-IoT devices.

In some examples, once a wireless terminal enters RRC_IDLE state, the wireless terminal attempts to camp on a suitable cell. One of the requirements, (S-Criteria), for determining a suitable cell is based on measurement of received signal level. FIG. 1 is a diagram 100 depicting NTN satellite coverage with corresponding received signal levels 103a, 103b, 103c at different times. At time T1, the NTN satellite 102a coverage 105a starts. As the satellite 102b moves, the NTN cell 105b moves to apex (shortest distance between wireless terminal 104 and satellite 102) at time T2, the received signal 103b will be the strongest. At time T3, satellite 102c coverage 105c is about to end. As the NTN cell 105c moves away from the wireless terminal 104c, the received signal level 103c is weaker than at time T2.

Figure 2:
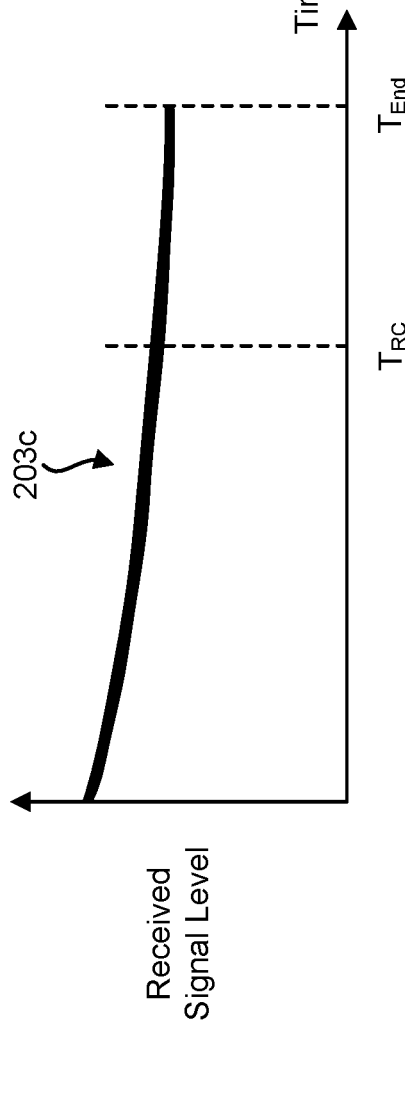
FIG. 2 is a diagram of an expanded view of the received signal strength level at time T3 in FIG. 1.

FIG. 2 is a diagram 200 depicting an expanded view of the received signal strength level 203c at time T3 in FIG. 1. $T_{RC}$ is the release connection time to switch from RRC_CON-NECTED to RRC_IDLE. $T_{RC}$ may be computed by the wireless terminal 104 or the core network node. After $T_{RC}$, the wireless terminal 104 immediately searches for a suitable cell. Depending on the computed value of $T_{RC}$. NTN coverage may be available, as depicted in the interval between $T_{RC}$ and $T_{End}$. If no suitable cells are nearby, the wireless terminal 104 may determine that the best cell to camp on is the same NTN cell that the wireless terminal 104 just disconnected from. This is because coverage may still be available after $T_{RC}$. If the wireless terminal 104 proceeds to camp on that same NTN cell, there is a high probability that the cell coverage may disappear shortly, and the RLF process begins, resulting in additional power consumption.

First Embodiment

A method to prevent wireless terminals 104a-c that were forced to RRC Idle mode from camping back on the previously connected NTN cell may include core network node transmission of a signaling release message with additional fields. The fields may include a descriptor indicating a request to transition to idle mode due to the upcoming discontinuous coverage period. Another field may include the absolute time the core network may release the connection to the wireless terminal 104. The NTN discontinuous coverage time may be calculated by the core network node provided that the core network node has wireless terminal ephemeris information. The core network node may derive the absolute time to release connection from NTN. ($T_{RC}$)

using the discontinuous coverage start time. At $T_{RC}$, the core network node may transmit an RRCRelease message to the wireless terminal 104. The RRCRelease message may contain a field that encapsulates two Information Elements (IE): NTN cell information to avoid and NTN cell avoid timer. The NTN cell information to avoid, (avoidNTNCell) IE, may contain Cell ID(s), satellite ID, cell frequency or any other unique NTN cell identifiers of the NTN cell that executed the RRCRelease. Multiple Cell IDs may be necessary if the NTN cell uses multiple beams with separate Cell ID for each beam. Satellite ID may also be used as an additional unique identifier since NTN cells may use the same Cell ID. The wireless terminal 104 may use avoidNTNCell to skip searching or camping on NTN cell. The Avoid NTN cell timer, (avoidNTNTimer) IE, may define the duration for the wireless terminal 104 to avoid camping on avoidNTNCell after entering cell selection process. Because the $T_{RC}$ may be incorrect due to calculation errors or inaccurate ephemeris data from the wireless terminal 104, avoidNTNTimer allows wireless terminal 104 to camp back on the NTN cell if the $T_{RC}$ time is much earlier than the actual start time of NTN discontinuous coverage.

Figure 3:
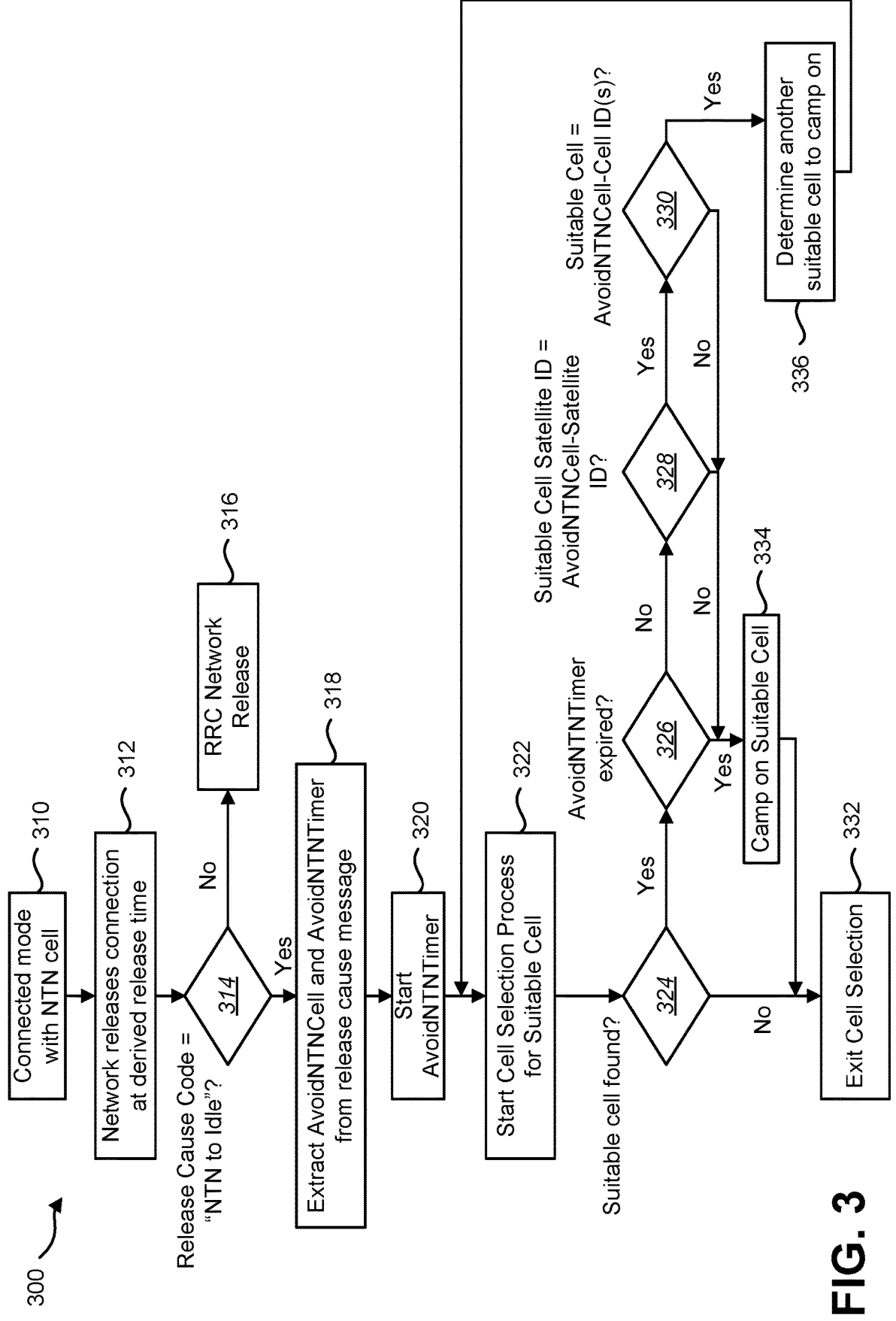
FIG. 3 is a flow diagram illustrating an example of a method performed by a core network node and wireless terminal.

FIG. 3 is a flow diagram 300 depicting representative steps by core network node and wireless terminal 104 after $T_{RC}$ has been derived and the wireless terminal 104 is in 310 RRC Connected mode with an NTN cell. At 312, the network releases connection at the derived release time. If it is determined 314 that the release cause code is not NTN to Idle, the RRC network is released 316. If the release cause code is NTN to Idle, AvoidNTNCell and AvoidNTNTimer are extracted 318 from the release cause message. At $T_{RC}$, the core network node may transmit an RRCRelease message with a cause code, avoidNTNCellInfo, indicating release is due to start of discontinuous coverage. If the release cause code is avoidNTNCellInfo, additional IEs are extracted:
    satelliteID
    cellInfoList
    avoidNTNTimer The avoidNTNTimer duration timer may be started 320 and the wireless terminal 104 may execute 322 a cell selection process once in RRC Idle state. If a suitable cell is found 324, the wireless terminal 104 checks 326 the state of the avoidNTNTimer. If the timer expired, then the wireless terminal 104 will camp 334 on the suitable cell. If the timer is still running, the wireless terminal 104 may first check 328 if the suitable cell satellite ID (if present) matches satellite ID in avoidNTNCellInfo. If the satellite ID matches, the wireless terminal 104 may verify 330 if the Cell ID of suitable cell matches any of Cell ID(s) in cellInfoList. If any Cell ID matches, the wireless terminal 104 may determine 336 another suitable cell to camp on. Otherwise, the wireless terminal 104 may camp 334 on the suitable cell. If no suitable cells are available, the wireless terminal 104 may exit 332 the cell selection process or continue with acceptable cell search at 322.

Listing 1 is an example implementation of NTN forced idle information transported using signaling message. The example in this case is RRCRelease message.

Listing 1

```
-- TAG-RRCRELEASE-START
RRCRelease ::=                              SEQUENCE {
    rrc-TransactionIdentifier               RRC-
TransactionIdentifier,
```

-continued

---
Listing 1
---

```
    criticalExtensions                      CHOICE {
        rrcRelease                              RRCRelease-IEs,
        criticalExtensionsFuture                SEQUENCE { }
    }
}
RRCRelease-IEs ::=                          SEQUENCE {
    redirectedCarrierInfo
RedirectedCarrierInfo
OPTIONAL, -- Need N
    cellReselectionPriorities
CellReselectionPriorities
OPTIONAL, -- Need R
    suspendConfig                           SuspendConfig
OPTIONAL, -- Need R
    deprioritisationReq                     SEQUENCE {
        deprioritisationType                    ENUMERATED
{frequency, nr},
        deprioritisationTimer                   ENUMERATED
{min5, min10, min15, min30}
    }
OPTIONAL, -- Need N
    lateNonCriticalExtension                OCTET STRING
OPTIONAL,
    nonCriticalExtension                    RRCRelease-
v1540-IEs
OPTIONAL
}
RRCRelease-v1540-IEs ::=                    SEQUENCE {
    waitTime                                RejectWaitTime
OPTIONAL, -- Need N
    nonCriticalExtension                    RRCRelease-v1610-IEs
OPTIONAL
}
RRCRelease-v1610-IEs ::=                    SEQUENCE {
    voiceFallbackIndication-r16             ENUMERATED {true}
OPTIONAL, -- Need N
    measIdleConfig-r16                      SetupRelease
{MeasIdleConfigDedicated-r16}        OPTIONAL, -- Need M
    nonCriticalExtension                    RRCRelease-v1650-IEs
OPTIONAL
}
RRCRelease-v1650-IEs ::=                    SEQUENCE {
    mpsPriorityIndication-r16               ENUMERATED {true}
OPTIONAL, -- Cond Redirection2
    nonCriticalExtension                    RRCRelease-v1710-IEs
OPTIONAL
}
RRCRelease-v1710-IEs ::=                    SEQUENCE {
    noLastCellUpdate-r17                        ENUMERATED
{true}                               OPTIONAL, -- Need S
    nonCriticalExtension                        RRCRelease-v1800-
IEs                                  OPTIONAL
}
RRCRelease-v1800-IEs ::=                    SEQUENCE {
    avoidNTNCellInfo-r18                        AvoidNTNCellInfo-
r18                                  OPTIONAL, -- Need S
    nonCriticalExtension                        SEQUENCE
{ }                                  OPTIONAL
}
RedirectedCarrierInfo ::=                   CHOICE {
    nr                                          CarrierInfoNR,
    eutra
RedirectedCarrierInfo-EUTRA,
    ...
}
RedirectedCarrierInfo-EUTRA ::=             SEQUENCE {
    eutraFrequency                              ARFCN-ValueEUTRA,
    cnType                                      ENUMERATED
{epc,fiveGC}
OPTIONAL -- Need N
}
AvoidNTNCellInfo-r18                                SEQUENCE {
    satelliteID                         SatelliteId,
    cellInfoList                        SEQUENCE (SIZE(1..maxCells)) OF
CellInfo,
```

-continued

---

Listing 1

---

```
    avoidNTNTimer              ENUMERATED {5sec, 10sec, 20sec,
    40sec, 80sec, 160sec, spare, spare }
    }
    CellInfo SEQUENCE {
      physCellId                 PhysCellId,
      carrierFreq                ARFCN-ValueNR
    }
```

---

Second Embodiment

Another method to prevent wireless terminals 104a-c that were forced to RRC Idle mode from camping back on the previously connected NTN cell may include the wireless terminal 104 to perform additional procedures during suitable cell search.

After obtaining NTN satellite information in SIB messages, the wireless terminal 104 may derive a release connection time interval based on the start time of discontinuous coverage. If a connection release occurs within the release connection time interval, the wireless terminal 104 may execute a modified suitable cell search procedure once the wireless terminal 104 transitions to RRC_IDLE mode.

Figure 4:
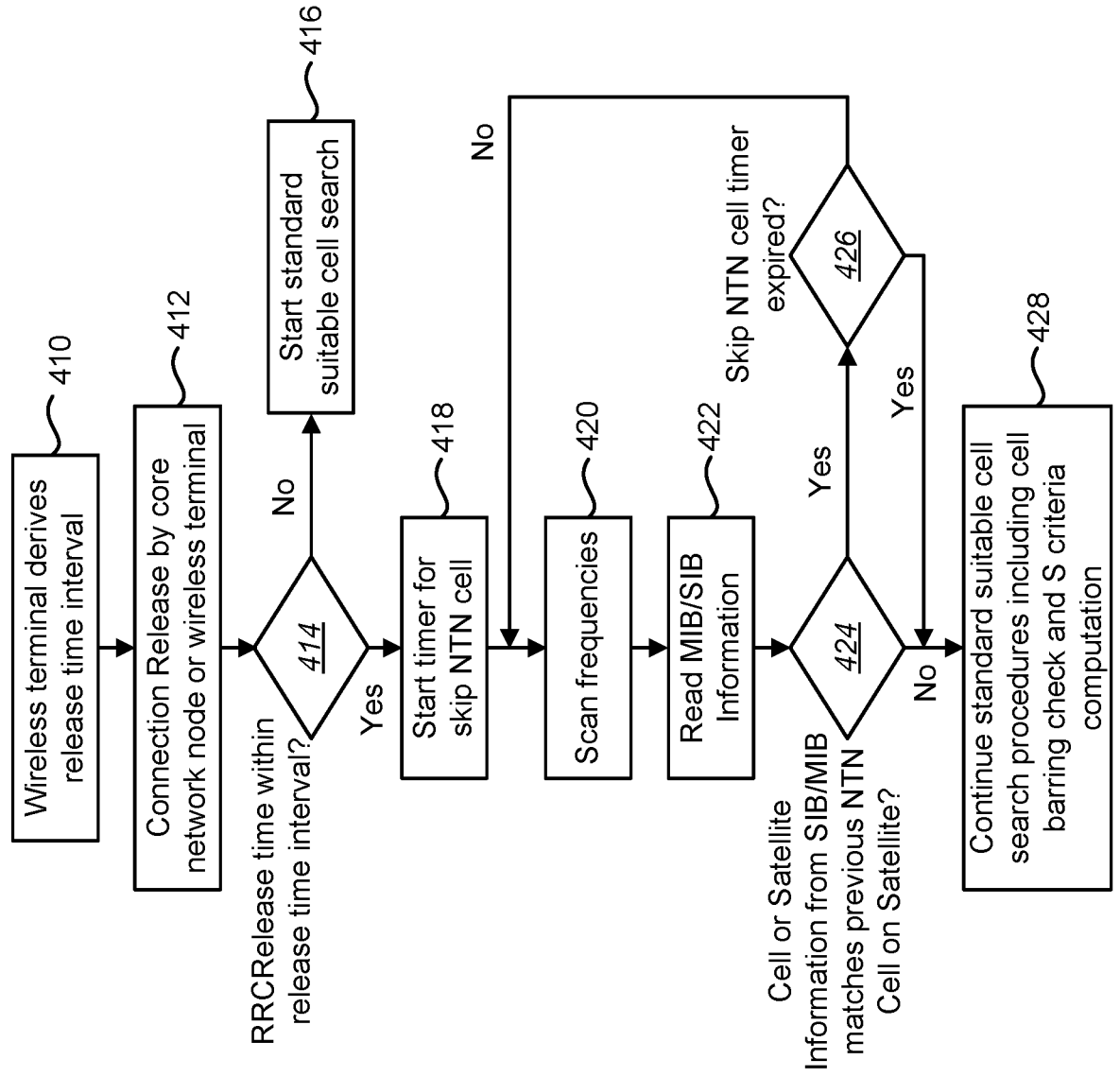
FIG. 4 is a flow diagram illustrating an example of a method performed by a wireless terminal.

FIG. 4 is a flow diagram 400 depicting representative steps by a wireless terminal 104 after transitioning to RRC_IDLE from RRCONNECTED via RRCRelease message or autonomously by the wireless terminal 104. Once the wireless terminal 104 enters RRC_IDLE, a suitable cell search process may occur. At 410, the wireless terminal 104 derives the release time interval. Subsequently, the connection is released 412 by the core network node of the wireless terminal 104. If it is determined 414 that the RRCRelease time is within the release time interval, then the timer will start 418 for the skip NTN cell. If the RRCRelease is not within the release time interval, the wireless terminal 104 will start 416 the standard suitable cell search.

In the current standard suitable cell search, the wireless terminal 104 scans 420 all channels/frequencies within the Public Land Mobile Network (PLMN). During the scanning process, Master Information Block (MIB) and System Information Block (SIB) of a cell is read 422 and if the cell is not barred, S-criteria, may be computed to determine suitability. The modified suitable cell search is similar to the current standard suitable cell search except before cell barring check, the wireless terminal 104 may perform additional verification on the potential suitable cell:

Potential suitable cell does not match any of the CellID(s) and frequencies of the previously connected NTN cell.

SatelliteID of potential suitable cell does not match the SatelliteID of the previously connected NTN cell.

If it is determined 424 that the cell or satellite information matches the previous NTN cell, it is then determined 426 whether the skip NTN cell timer expired. If any of the above criteria is false, the wireless terminal 104 may search 428 for another cell. Otherwise, the wireless terminal 104 may compute the S criteria to determine a suitable cell. However, the wireless terminal 104 may have a timer running in the background during the modified suitable cell search process. The NTN cell matching procedure may be ignored if the timer expires. The value of the timer is determined by the wireless terminal 104.

Third Embodiment

A method to transition from RRC_CONNECTED mode to RRC_IDLE may include a transmission of a request from a wireless terminal to a core network node using signaling messages. The NTN cell may be in RRC_CONNECTED mode with potentially thousands of wireless terminals. If those connected wireless terminals are in the same geographic area, the discontinuous coverage start time may also be similar. The Access and Mobility Management Function (AMF) may determine that the connection release time may need to be staggered due to excess overhead or resource usage. The core network node replies to the wireless terminal 104 with a proposed connection release time. The network may not want to release all connected wireless terminals 104a-c at the same time. If core network node provides an optimal RRC_CONNECTION release time, a reduction of wireless terminals performing autonomous release at approximately the same time may occur.

Figure 5:
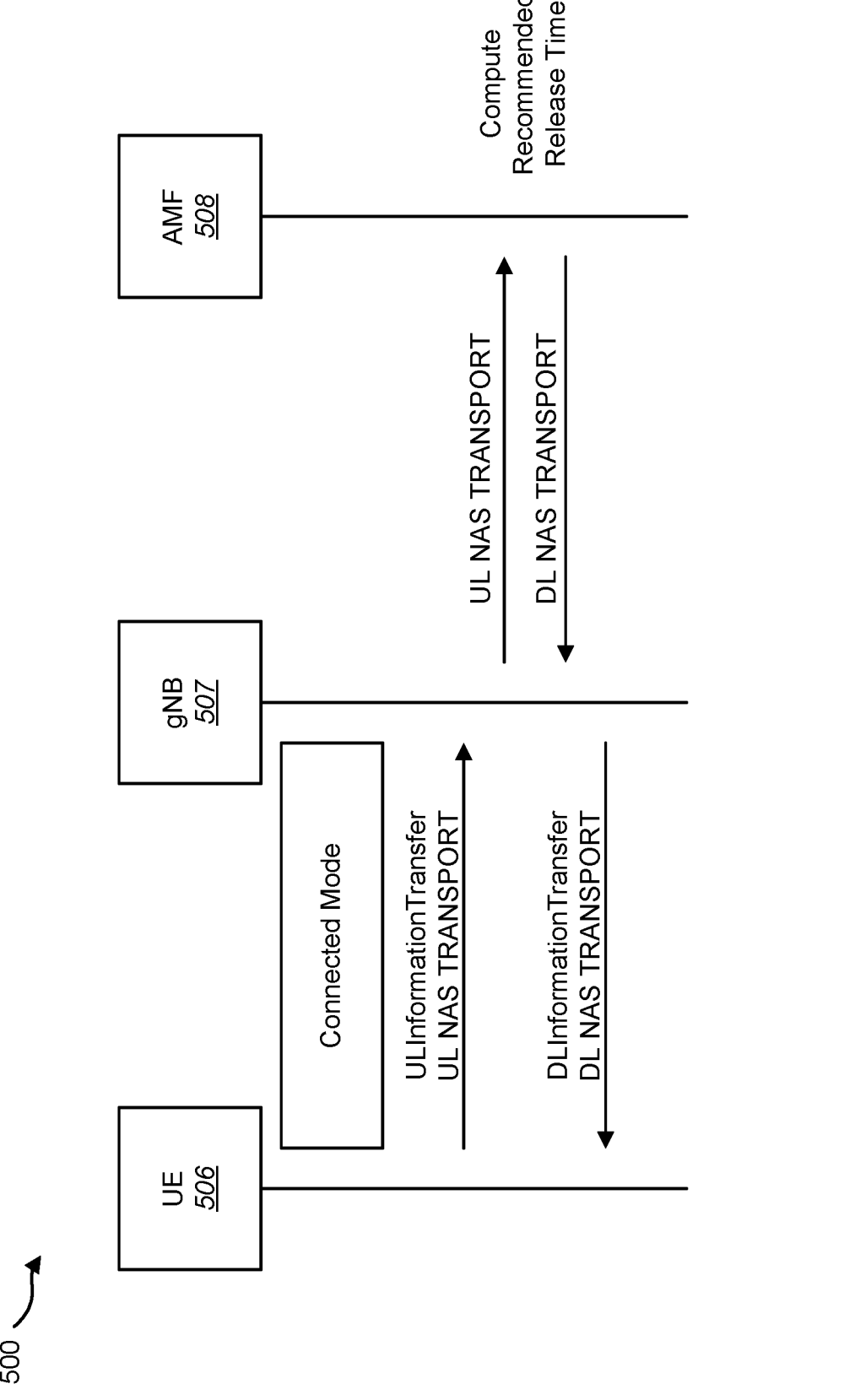
FIG. 5 is a sequence diagram illustrating an example of a wireless terminal requesting NTN cell information.

FIG. 5 is a diagram 500 depicting the use of ULInformationTransfer combined with Uplink Non-Access Stratum (UL NAS) Transport signaling messages that may be used to request recommended RRC_CONNECTION release time from core network node. Once the wireless terminal 104 is in RRC_CONNECTED mode, the wireless terminal 104 may transmit UL NAS TRANSPORT message that is encapsulated in the RRC ULInformationTransfer message. The UL NAS TRANSPORT message is provided to the AMF 508 by the gNB 507. The recommended connection release time computed by the core network node, specifically the Access and Mobility Management Function (AMF) 508, may be transmitted back to the wireless terminal 104 using Downlink (DL) NAS Transport message encapsulated in the DLInformationTransfer message.

Listing 2 is an example implementation of UL NAS TRANSPORT message that may be used for transmitting request for recommended connection release time to the core network node from the wireless terminal 104.

---

UL NAS TRANSPORT message content
Listing 2

---

| IEI | Information Element | Type/Reference | Presence | Format | Length |
|---|---|---|---|---|---|
| | Extended protocol discriminator | Extended protocol discriminator 9.2 | M | V | 1 |

-continued

| IEI | Information Element | Type/Reference | Presence | Format | Length |
|---|---|---|---|---|---|
| | | UL NAS TRANSPORT message content Listing 2 | | | |
| | Security header type | Security header type 9.3 | M | V | ½ |
| | Spare half octet | Spare half octet 9.5 | M | V | ½ |
| | UL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 59 | Old PDU session ID | PDU session identity 2 9.11.3.41 | O | TV | 2 |
| 8- | Request type | Request type 9.11.3.47 | O | TV | 1 |
| 22 | S-NSSAI | S-NSSAI 9.11.2.8 | O | TLV | 3-10 |
| 25 | DNN | DNN 9.11.2.1B | O | TLV | 3-102 |
| 24 | Additional information | Additional information 9.11.2.1 | O | TLV | 3-n |
| A- | MA PDU session information | MA PDU session information 9.11.3.31A | O | TV | 1 |
| F- | Release assistance indication NTN Release Connection Time Request | Release assistance indication 9.11.3.46A | O | TV | 1 |

Listing 3 is an example implementation of DL NAS TRANSPORT message that may be used for transmitting the computed recommended connection release time to the wireless terminal 104.

| IEI | Information Element | Type/Reference | Presence | Format | Length |
|---|---|---|---|---|---|
| | | DL NAS TRANSPORT message content Listing 3 | | | |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | DL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 24 | Additional information | Additional information 9.11.2.1 | O | TLV | 3-n |
| 58 | 5GMM cause | 5GMM cause 9.11.3.2 | O | TV | 2 |

-continued

| | DL NAS TRANSPORT message content | | | | |
|---|---|---|---|---|---|
| | Listing 3 | | | | |
| IEI | Information Element | Type/Reference | Presence | Format | Length |
| 37 | Back-off timer value | GPRS timer 3 9.11.2.5 | O | TLV | 3 |
| 3A | Lower bound timer value NTN Recommended Release Time | GPRS timer 3 9.11.2.5 | O | TLV | 3 |

Fourth Embodiment

A method to transition the wireless terminal 104 from RRC_CONNECTED mode to RRC_IDLE may also include a wireless terminal autonomously switching to RRC_IDLE. The wireless terminal 104 may compute time to transition from RRC_CONNECTED to RRC_IDLE. Using RRC or NAS messages, the wireless terminal 104 may transmit the computed transition time for the core network node to release RRC connection. At the transition from RRC_CO-NNECTED to RRC_IDLE time, the wireless terminal 104 may start a wait for release timer. If the wireless terminal 104 has not received an RRCRelease message after the expiration of the wait for release timer, the wireless terminal 104 may autonomously transition to RRC Idle.

The following signaling messages may be used to transmit User Equipment (UE) 506 computed transition to RRC_IDLE time:

UEAssistanceInformation

ULInformationTransfer and UL NAS TRANSPORT messages.

The UEAssistanceInformation is a wireless terminal-initiated message that may be transmitted while in RRC_CO-NNECTED mode. The IE parameters to transmit may include transition to RRC_IDLE time and a wait timer that indicates time left for the core network node to transmit an RRCRelease message after the transition to RRC_IDLE time.

Listing 4 is an example implementation of UEAssistanceInformation message that may be used for transmitting transition to RRC_IDLE time to the core network node.

The ULInformationTransfer with encapsulated UL NAS TRANSPORT message may also be utilized to transmit wireless terminal-initiated message to the core network node. IE parameters may include transition to RRC_IDLE time and a wait timer that indicates time left for the core network node to transmit an RRCRelease message after the transition to RRC_IDLE time. The core network node may or may not respond with DL NAS TRANSPORT message.

For both signaling messages, if the wait timer expires the wireless terminal 104 may autonomously transition to RRC_IDLE mode without RRCRelease message.

Listing 5 is an example implementation of UL NAS TRANSPORT message that may be used for transmitting transition to RRC_IDLE time to the core network node.

| | | UL NAS TRANSPORT message content | | | |
|---|---|---|---|---|---|
| | | Listing 5 | | | |
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | UL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 59 | Old PDU session ID | PDU session identity 2 9.11.3.41 | O | TV | 2 |
| 8- | Request type | Request type 9.11.3.47 | O | TV | 1 |

-continued

| IEI | Information Element | Type/Reference | Presence | Format | Length |
|---|---|---|---|---|---|
| | | UL NAS TRANSPORT message content | | | |
| | | Listing 5 | | | |
| 22 | S-NSSAI | S-NSSAI 9.11.2.8 | O | TLV | 3-10 |
| 25 | DNN | DNN 9.11.2.1B | O | TLV | 3-102 |
| 24 | Additional information | Additional information 9.11.2.1 | O | TLV | 3-n |
| A- | MA PDU session information | MA PDU session information 9.11.3.31A | O | TV | 1 |
| F- | Release assistance indication NTN Transition to RRC_IDLE mode information | Release assistance indication 9.11.3.46A | O | TV | 1 |

Figure 6:
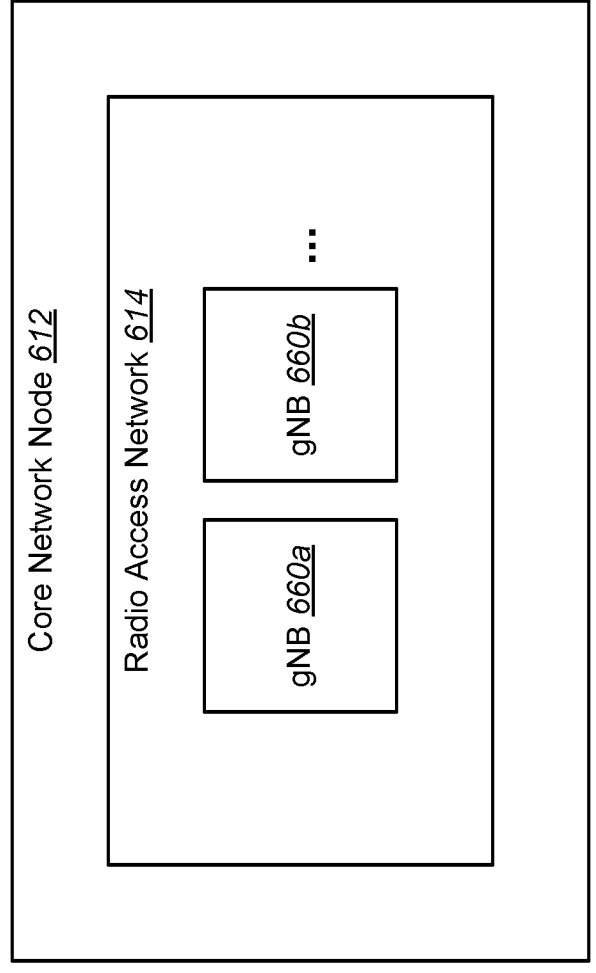
FIG. 6 is a block diagram illustrating one implementation of a core network node.

FIG. 6 is block diagram illustrating one implementation of a core network node 612. The core network node 612 may include a radio access network 614 that includes a plurality of gNBs (gNB 660*a*, 660*b*). Messages transmitted and received by the core network node 612 may be transmitted and received by the gNBs 660*a*, 660*b* in the radio access network 614.

Figure 7:
FIG. 7 is a block diagram illustrating one implementation of a gNB.

FIG. 7 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 Uplink Control Information (UCI). The PUSCH receiver 1137 may provide the higher layer processor 1123 received transport blocks.

Figure 8:
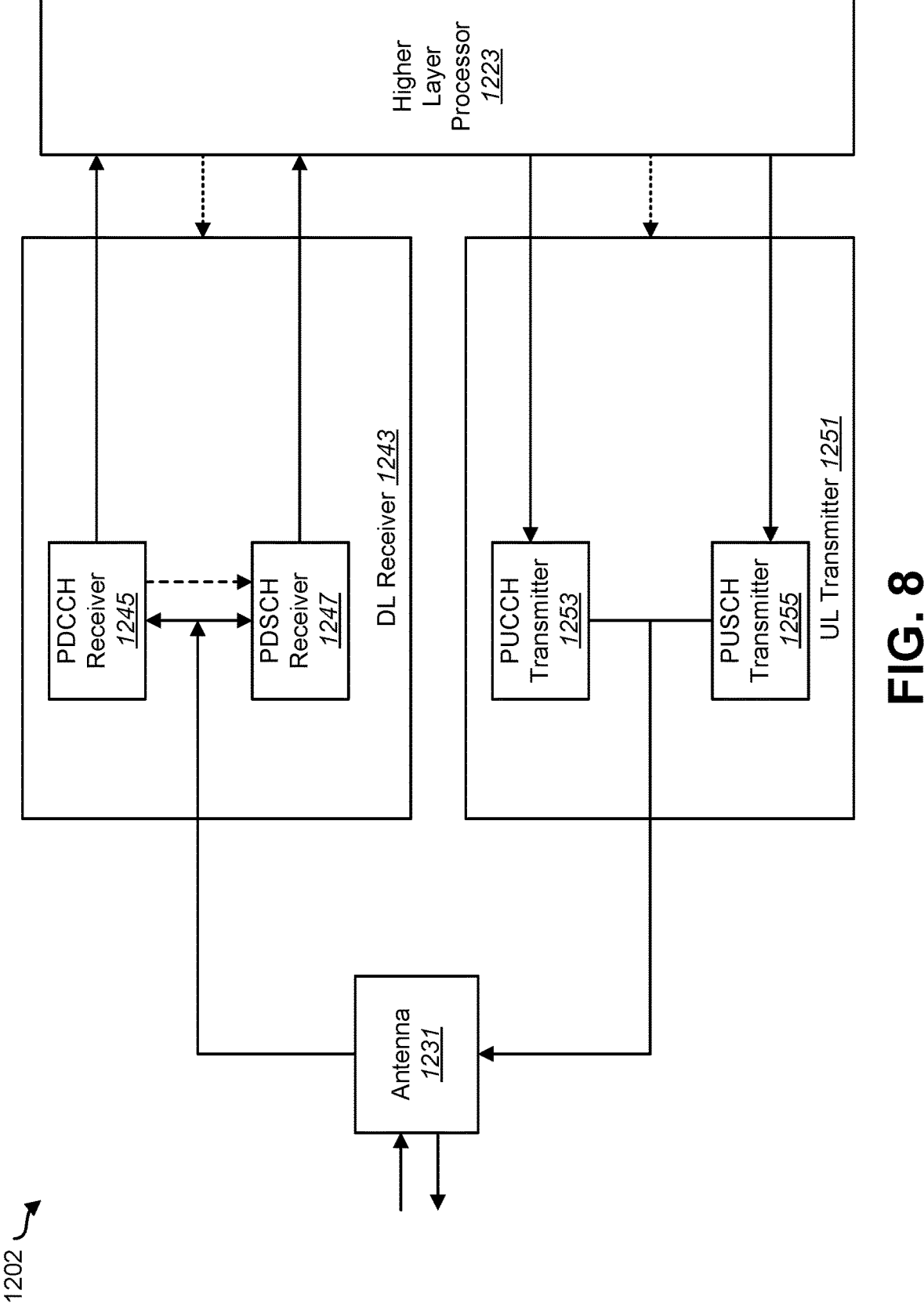
FIG. 8 is a block diagram illustrating one implementation of a wireless terminal.

FIG. 8 is a block diagram illustrating one implementation of a wireless terminal 1202. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G) PDCCH, GPDSCH, GPUCCH and GPUSCH" or the like can be used.

Figure 9:
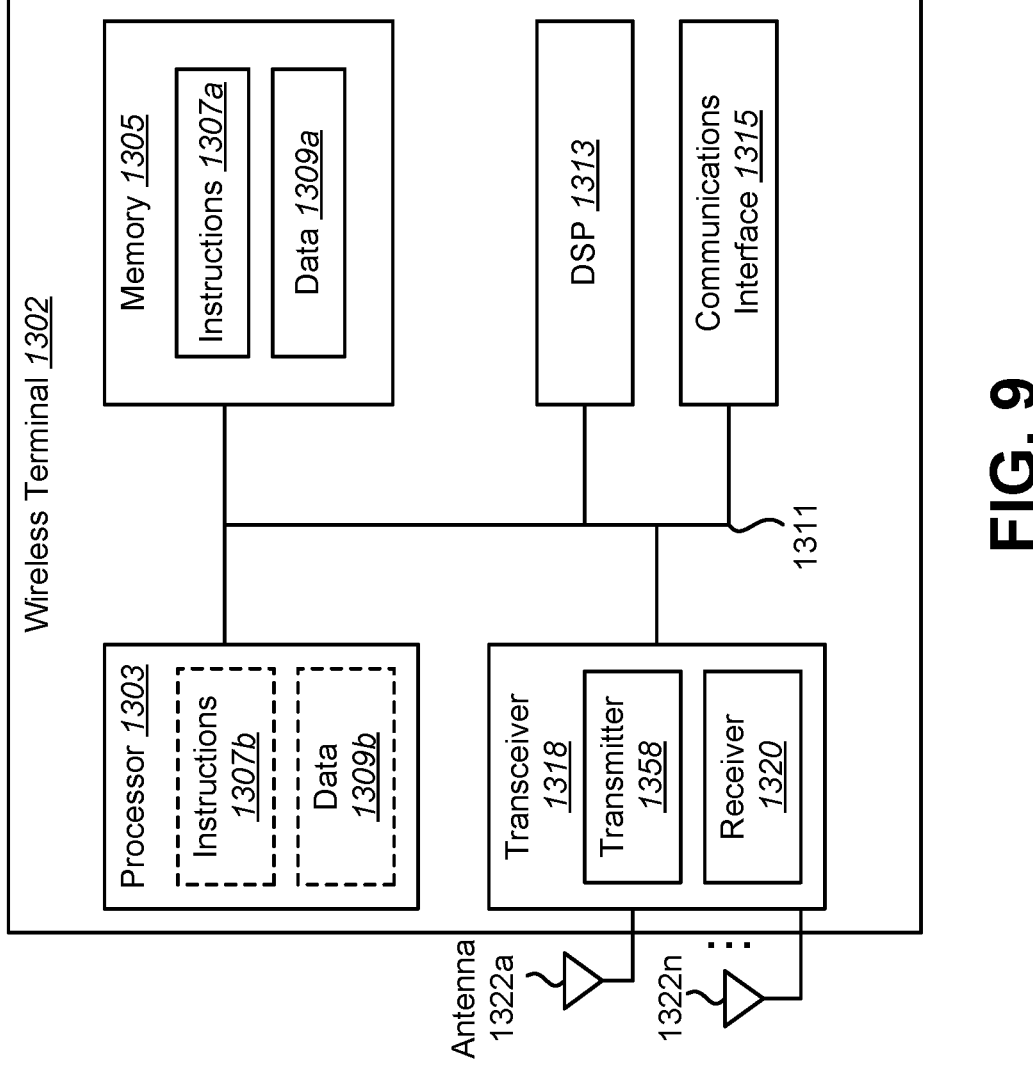
FIG. 9 illustrates various components that may be utilized in a wireless terminal.

FIG. 9 illustrates various components that may be utilized in a wireless terminal 1302. The wireless terminal 1302 described in connection with FIG. 9 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 9 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 9 is a functional block diagram rather than a listing of specific components.

Figure 10:
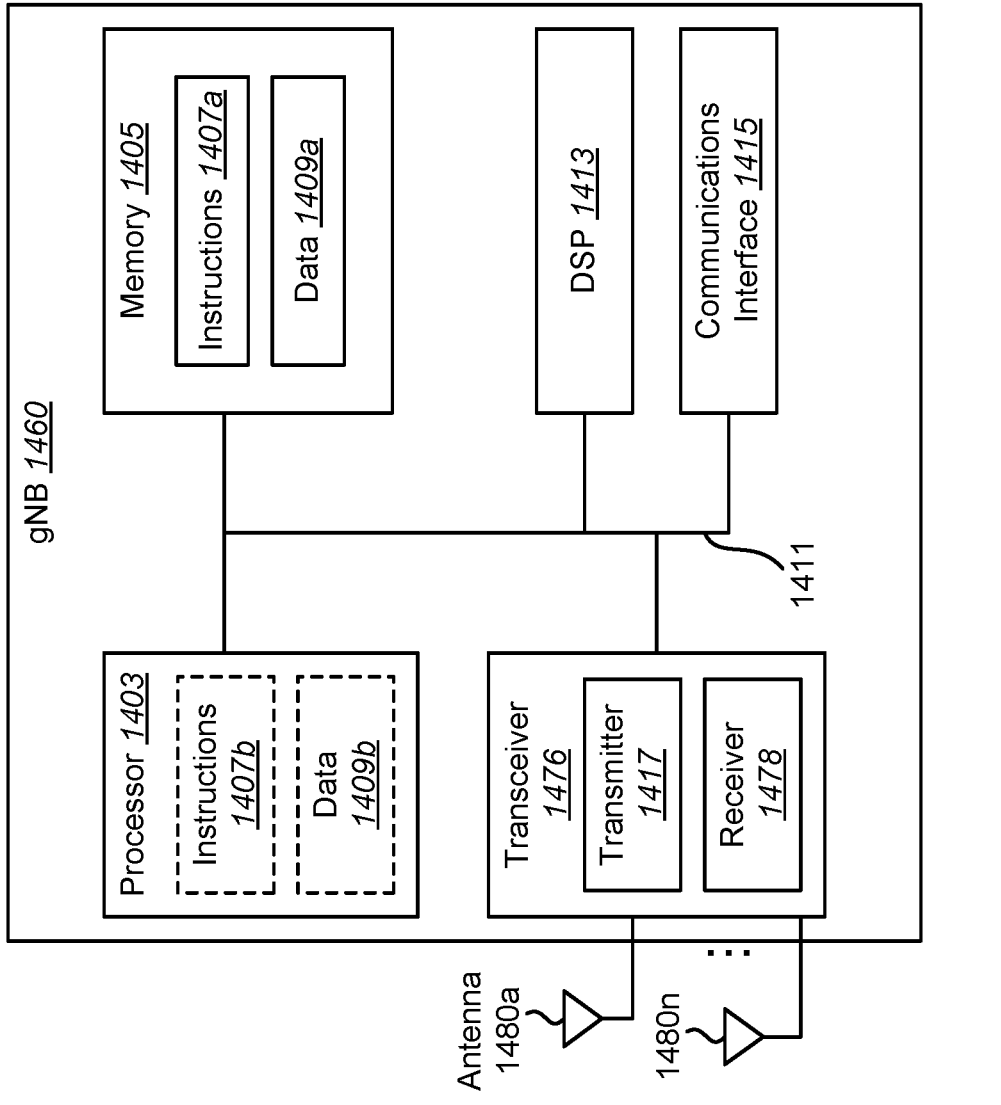
FIG. 10 illustrates various components that may be utilized in a gNB.

FIG. 10 illustrates various components that may be utilized in a gNB 1460. The gNB 1460 described in connection with FIG. 7 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 10 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 10 is a functional block diagram rather than a listing of specific components.

Figure 11:
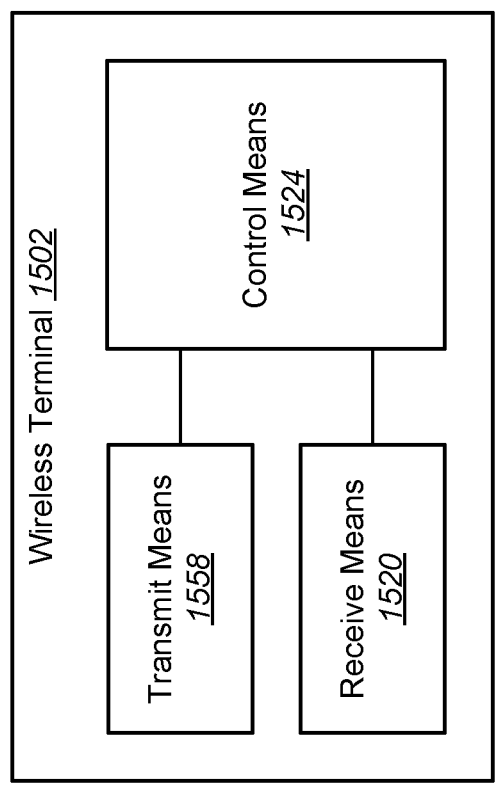
FIG. 11 is a block diagram illustrating one implementation of a wireless terminal in which the present systems and methods may be implemented.

FIG. 11 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 9 above illustrates one example of a concrete apparatus structure of FIG. 11. Other various structures may be implemented to realize one or more of the functions herein. For example, a DSP may be realized by software.

Figure 12:
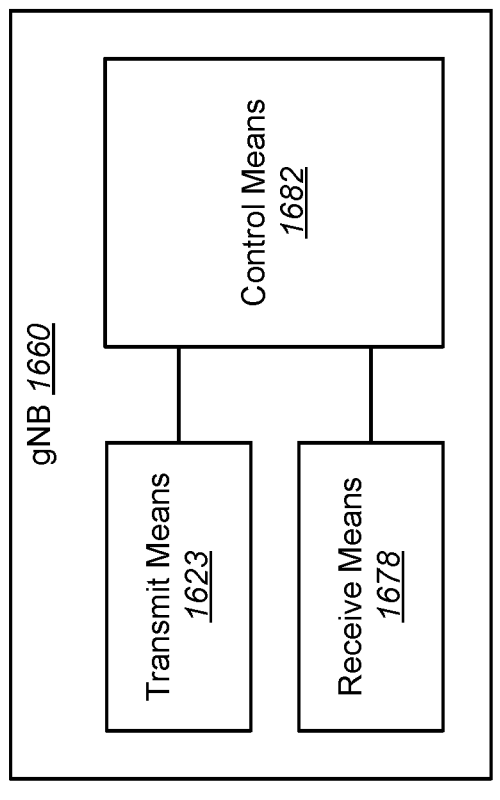
FIG. 12 is a block diagram illustrating one implementation of a gNB in which the present systems and methods may be implemented.

FIG. 12 is a block diagram illustrating one implementation of a gNB 1660 in which systems and methods for resource allocations of enhanced uplink transmissions may be implemented. The gNB 1660 includes transmit means

1623, receive means 1678 and control means 1682. The transmit means 1623, receive means 1678 and control means 1682 may be configured to perform one or more of the functions described herein. FIG. 10 above illustrates one example of a concrete apparatus structure of FIG. 12. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or Hard Disk Drives (HDDs), and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A wireless terminal, comprising:
circuitry configured to:
   derive a release connection time interval based on a start time of non-terrestrial network (NTN) discontinuous coverage;
   perform a connection release to enter an RRC_IDLE state; and
   execute, in the RRC_IDLE state, a modified cell search procedure if the connection release occurs within the release connection time interval, wherein during the modified cell search procedure, reselecting previously connected NTN cells is avoided.

2. The wireless terminal of claim 1, wherein the wireless terminal enters an RRC_IDLE state without receiving a release message from a core network node.

3. The wireless terminal of claim 1, wherein the release connection time interval is derived to prevent re-selection of a non-terrestrial network (NTN) cell by the wireless terminal for a specific amount of time.

4. A core network node, comprising:
transmitting circuitry configured to:
   derive a release connection time interval based on a start time of non-terrestrial network (NTN) discontinuous coverage;
   perform a connection release to cause a wireless terminal to enter an RRC IDLE state; and
   cause the wireless terminal to execute, in the RRC_IDLE state, a modified cell search procedure if the connection release occurs within the release connection time interval, wherein during the modified cell search procedure, reselecting previously connected NTN cells is avoided.

5. The core network node of claim 4, wherein the release connection time interval is derived to prevent re-selection of a non-terrestrial network (NTN) cell by the wireless terminal for a specific amount of time.

6. A method by a wireless terminal, comprising:
deriving a release connection time interval based on a start time of non-terrestrial network (NTN) discontinuous coverage;
performing a connection release to enter an RRC_IDLE state without receiving a release message from a core network node; and
executing, in the RRC_IDLE state, a modified cell search procedure if the connection release occurs within the release connection time interval, wherein during the modified cell search procedure, reselecting previously connected NTN cells is avoided.

* * * * *